Figure 1:
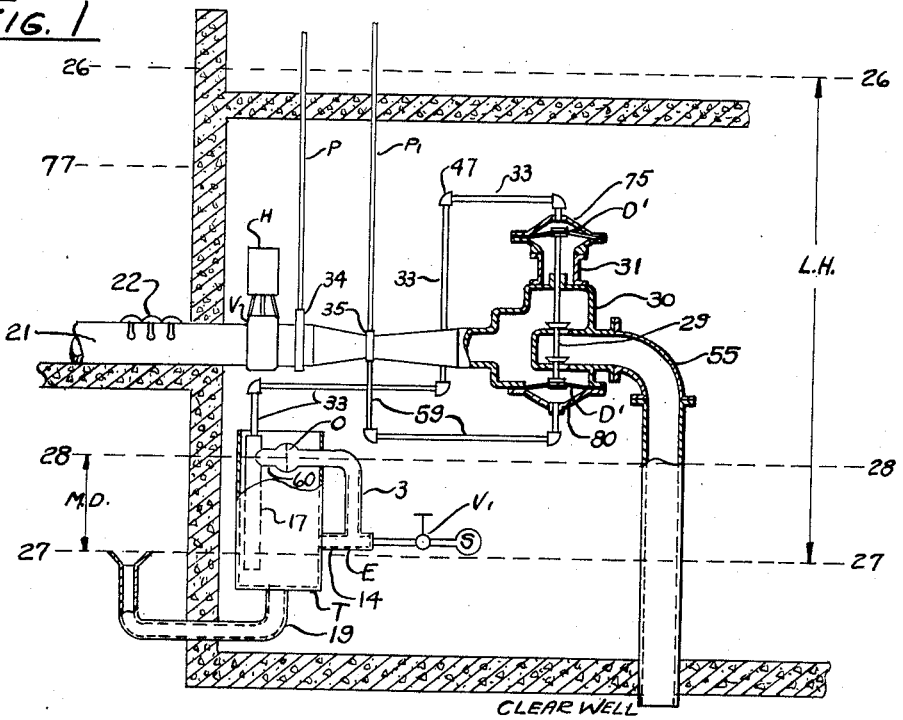

July 15, 1941.  C. A. BROWN  2,249,719

FLUID FLOW CONTROL SYSTEM

Filed Feb. 3, 1937

INVENTOR.
CHARLES ARTHUR BROWN

Patented July 15, 1941

2,249,719

UNITED STATES PATENT OFFICE 2,249,719

FLUID FLOW CONTROL SYSTEM

Charles Arthur Brown, Lorain, Ohio, assignor, by mesne assignments, to Virginia R. Brown, Lorain, Ohio Application February 3, 1937, Serial No. 123,783

6 Claims. (Cl. 137—68)

My invention has relation to a device for continuously withdrawing and separating a portion of subatmospheric pressure from a larger but indefinite amount of subatmospheric pressure and utilizing the portion so withdrawn and separated from the total subatmospheric pressure for various purposes.

Heretofore, considerable difficulties have been encountered in attempting fluid measurement and control. Thus, in indicating or measuring varying liquid levels or differences between such levels, where such indication or measurement is required at altitudes or at distances removed from such varying liquid levels or difference of levels, the indicating or measuring means, usually comprising several moving parts, have been more or less inaccurate, due to contracting and expanding connections, lost motion or wear of mechanical parts, or to the force required to overcome their inertia, and effect motion of the parts.

Where liquid indicating columns have been employed, the accumulation of foreign matters on their surfaces have made indication indefinite or required frequent cleanings. In the use of conduits as connecting means, the size of the conduits have had to be large enough to prevent fluid frictional losses, which would interfere with the accuracy of the readings, all of these matters being known to those skilled in the art.

An object of my present invention is to utilize the separation of a portion of a higher subatmospheric pressure to automatically vary in the amount so withdrawn inversely with the varying liquid level and do so accurately and dependably.

Another object of my invention is to effect such withdrawals or separations of one or more portions of a higher subatmospheric pressure in such manner as to permit the indicating, measuring, or controlling means intended for use at a distance from the levels or difference of levels, either in elevation or lateral distance therefrom.

Another object of my invention is to provide an improved system whereby these results shall be attained with greater accuracy and dependability, as well as at a lesser cost than apparatus now available, which attempts to function more or less similarly.

One of the many uses to which my invention is adaptable, shown herein for purposes of illustration, has relation to a device for controlling fluid flow from one or a plurality of filters, in accordance with a varying liquid level which varies substantially in accordance with the consumption demand for filtered water.

Heretofore, there has been comparatively little difficulty in controlling the flow from filters when the maintenance of a fixed rate of flow from such filters has been deemed desirable, in fact, there are several different types of such control which have been well nigh perfected and which provide results which are entirely satisfactory.

Even where the best of this type of control is employed and where such controllers function exactly and perfectly as designed, in plants where the demand for filtered water varies largely, from hour to hour during the day and night, it becomes necessary, at some times, to put some filters out of service, when the consumption demand is low, and, at other times, when the consumption demand increases, to put additional filters back into service.

Practice in the art has resulted in establishing, generally, two limiting rates of filtration, one being a normal safe rate of filtration equal to 125,000,000 gallons of water per acre of sand filtering area, per 24 hours. The other is an emergency rate, beyond which it is not deemed wise to go. This emergency rate is not so well defined and varies, according to different authorities and conditions but, broadly speaking, it may be deemed to be about 50 percent in excess of the normal safe rate of filtration.

Practically all modern controllers have provisions for adjusting the rate of filtration anywhere between the emergency or overload rating and a rating of from 10 to 25 per cent of the normal safe rating. Practically all such controllers also require an attendant to go to each controller every time it is desired to change the rate and manually alter the setting of the rate controlling device. The controllers are usually in a location where it is bothersome to get to each one of them, therefore rate changes are seldom made, the operator finds it easier to cut filters off and turn them on, as best meets the conditions.

Many attempts have been made in the past to devise controlling systems which would automatically and coincidentally alter the rate of filtration in accordance with the consumption demand. Some of these have been more or less successful and in these plants, all filters are kept in service all the time and the rate of filtration from each is automatically increased as the consumption demand increases and decreased as the consumption demand decreases. Broadly speaking again, the result in plants where such operation is possible, even though faulty, has proven superior to results in other plants where filters are alternately cut in and out of service to meet demands.

The cost of equipment and maintenance, together with other difficulties, have not brought such systems into popular use. I have discovered what I believe to be a new and useful improvement in methods of accomplishing the desired results which permits a very simple and inexpensive auxiliary equipment to be added to some types of fixed rate controllers, whereby such controllers may be converted into variable rate controllers which will automatically alter the rate of filtration in accordance with a varying water level in the clear well into which all filters discharge and in substantial accordance with the consumption demand, thus permitting all filters to be kept in operation all the time, at rates not exceeding a safe emergency overload, whatever that may be deemed to be.

Thus, it will be seen that, when so applied, my invention will provide apparatus to automatically control the flow from a plurality of filters, whereby the flow from each filter will be maintained at substantially the same rate of flow as every other filter but to vary the rate of flow from all filters coincidentally, equally and proportionally to the changing water level in the clear well or compartment into which all filters discharge and thereby maintain a rate of flow from all filters which varies substantially in accordance with the consumption demand for filtered water.

My invention accomplishes such control by means which include, as a part of said means, the use of subatmospheric pressures, by causing the varying level of the clear well to automatically separate from a higher, indeterminate subatmospheric pressure, the required, exact, subatmospheric pressure which, varying in amount proportionally to said varying water level, is utilized in lifting water from the said varying water level to a point of fixed datum.

It will be seen that my invention will provide for the use of certain standard and proven fixed rate control equipment and devices, in combination with more recently developed apparatus and methods, whereby said older and standard equipment is caused to operate in such manner as to control and vary the rate of flow substantially in accordance with or proportionally to the consumption demand rate, instead of maintaining a fixed rate of flow, as such standard equipment now does.

As perfected and adapted to the illustratory example herein, my invention provides an improved system whereby these results shall be attained with greater accuracy and dependability, as well as at a lesser cost than apparatus now available, which attempts to function more or less similarly, insofar as the final result is concerned.

It will, of course, be understood that the particular adaptation of the invention herein disclosed is an example without limitation since it is apparent that the present invention is inherently adapted to many other uses, by way of example of which the following are offered: Indication at a remote point of a liquid level; the difference between two liquid levels; the indication and control of volumes of flow; the measurement of water ballast in sea-going vessels; the measurement and indication of the angle of inclination, either laterally or longitudinally, of departure of a vessel from even keel; the adjustment or control of valves of almost any type; the indication of the rise and fall of tides, etc. The examples may be carried on indefinitely but it is felt that the foregoing, when taken with an understanding of the principles underlying the present invention will be sufficient to give those skilled in the art some idea as to the versatility thereof.

Other objects, advantages and uses of my invention and the invention itself will become apparent as the following description of an embodiment of my invention progresses, and in which description reference will be had to the accompanying drawing forming a part of this specification.

Referring to the drawing:

Fig. 1 shows a more less typical arrangement of parts, which, in part, are in common use today, supplementing those so shown with those required in this embodiment of my invention. The type of controller shown herein consists of a Venturi tube, a valve chamber, a balanced valve, inflexibly attached to a diaphragm, in said valve chamber, with the stem of the valve projecting upwardly through a gland and an arrangement for conducting the varying pressure in the throat chamber of the venturi to the pressure chamber underneath the diaphragm attached to the balanced valve.

Figure 2:
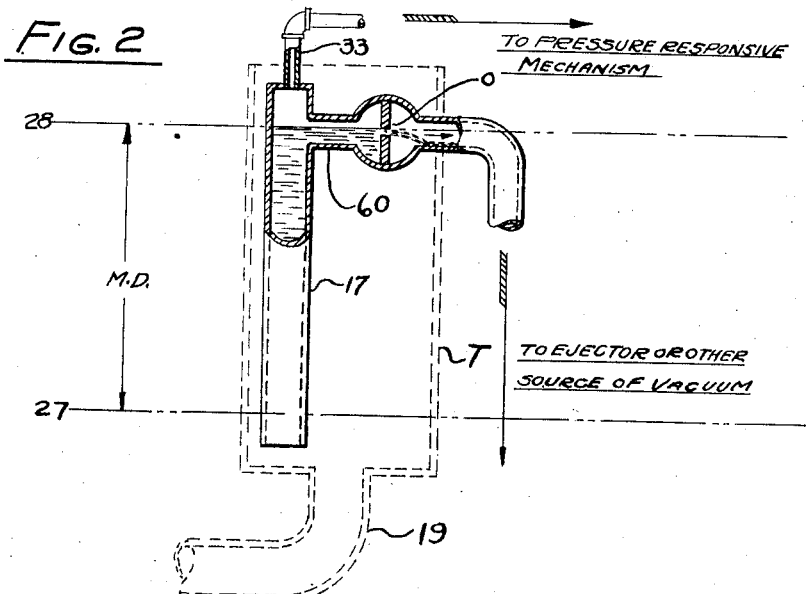

Figure 2 represents an enlarged sectional elevational view of a preferred form of apparatus for carrying out the invention, one specific application for which is illustrated in Figure 1.

In these particulars and arrangement of parts, the controller shown herein is a representative section of a very well known and widely used fixed rate controller. To operate such controller as a fixed rate controller, one end of a lever, by a flexible connection, is attached to the upper end of the extended shaft of the balanced valve. The lever arm is fulcrumed a short distance away from the valve stem, and, on the arm extending beyond the fulcrum, there is a scale marked on the arm, a weight being movable thereon. The weight carries an index, which, when brought into coincidence with the scale markings, indicates the rate of flow through the controller, obtained by such setting. The weight, if moved, must be moved by the attendant, standing alongside the weight arm. These details, as a fixed rate controller, are not shown in Fig. 1.

In place of such details, I show other details which are employed to convert such a controller into a controller of another type, such newer type being one which can be made to operate either as a constant rate or variable rate controller. I shall now proceed to the description of such new type of controller.

In Fig. 1, I show one end wall, 20, of a filter, a section of the operating floor, pipe gallery floor and clear well. The wall, 20, is pierced by a conduit, 21, some strainer heads, 22, being tapped thereinto inside the filter. Outside the filter, the conduit is provided with a valve, V, operated by haydraulic cylinder, H. Beyond this valve, V, there is a Venturi tube, with its approach chamber, 34, and a piezometer tube, P, rising therefrom. The throat chamber of the venturi, 35, is also provided with a piezometer, P', rising therefrom.

The difference of water levels in these two piezometers is a function of the rate of flow through the Venturi tube, the level in P' always standing lower than the level in piezometer P, when flow is occurring through the venturi.

At the end of the Venturi tube, known as the recovery end of the tube, there is a valve chamber, 30, in which there is installed a so called balanced valve, 29, the lower end of the stem of this valve being rigidly attached to a diaphragm, D, while below the diaphragm, D, there is provided a casing head, 80, serving to seal the diaphragm around its outer perimeter and converting the space between the diaphragm, D, and its casing head, 80, into a hermetically sealed chamber.

The flow approaching the balanced valve, 29, is one which possesses a higher pressure than that in the throat of the venturi, the difference between the two being functional to the rate of flow and this higher pressure of the flow approaching the balanced valve, 29, is exerted directly and downwardly upon the upper surface of the diaphragm, D, tending to close the balanced valve and prevent flow therethrough. A connection, 59, between the diaphragm, D, and the throat chamber of the venturi, 35, transfers the pressure in the throat chamber, 35, to the pressure chamber between the diaphragm, D, and its casing head, 80.

This pressure is exerted upwardly against the diaphragm, D, tending to lift the diaphragm, and open the balanced valve, 29. With this arrangement, it is fairly obvious that the forces tending to close the valve are greater than those tending to open it. The water pressure above the diaphragm, with no flow occurring, is equal to the pressure underneath it but the weights of the diaphragm and its associated parts are adequate, in such case, to maintain the valve in its closed position, if the pressures upon the two sides of the diaphragm are equal.

When flow is occurring, the pressure of the water on the upper side of the diaphragm, being in excess of the pressure under the diaphragm, supplements and augments the weight of the valve and diaphragm, increasing the force tending to close the valve. In the fixed rate type, the lever arm, with its sliding weight, previously described but not shown in Fig. 1, provides a way to overcome the forces tending to close the valve, 29, and maintain a desired difference of pressure upon the two sides of diaphragm, D.

The pressure available to create flow through the filter bed, underdrain system, venturi and balanced valve is the head, L. H., or the difference between water levels, 26 and 27, or the level above the filter and that in the clear well, the first varying within rather narrow limits but the second usually varying over a more considerable range. When the filter is clean, its resistance to flow is low but as it gradually accumulates its load of impurities, its resistance to flow increases.

The function of the controller is to cause the balanced valve, 29, to interpose just enough resistance to flow to absorb all the head available to create flow which is not required to create the flow which is desired. The balanced valve, to do this, interposes a varying resistance to flow, by varying its port opening. When the filter is clean, the valve adjusts itself to a small port opening and as the load on the filter increases, the port openings in the valve are gradually increased in size. As very minute changes in the position of the balanced valve mean relatively large changes in its port opening, very accurate control of the valve is required.

In the embodiment of my invention shown herein, it is my purpose to show how a certain limited range of variation in the level of the clear well may be caused to create and maintain a coincidentally varying subatmospheric pressure which may be employed to effect a very delicate control of the balanced valve, 29, to vary the flow therethrough, proportionally to the changing level in the clear well, thus preventing excessive variation of the level in the clear well, without the necessity of cutting the filter out of and into service, in order to prevent such excessive variation of level in the clear well, in other words, to regulate the flow from the filter or a plurality of filters substantially in varying rate, proportionally of the varying consumption demand for water.

To do this, it is essential to provide equipment and apparatus not previously described, as follows. It is desired that the level in the clear well shall not rise above the dotted line position, 28, nor fall below the dotted line position, 27, thus maintaining a range of variation in the clear well which will not exceed the distance between these two dotted line positions, or the distance M. D., as shown. By reference to Figure 2 one form of device, constructed to effect the principles of the present invention in carrying out these conditions, is shown in greater detail.

A tank, T, with its top wall above the dotted line position, 28, and its bottom below the dotted line position, 27, is shown, with a conduit, 19, leading from its bottom into the clear well and terminating at its upper end therein in a spreading mouth at the dotted line position 27. Variations of clear well level below 27 will be inoperative to effect further change of level in the tank, T. The conduit, 19, is of adequate size to permit any flow which can occur from the tank, T, into the clear well without sensibly affecting the level in the tank, T, regardless of the level in the clear well.

An ejector, E, is supplied with a source, S, of high pressure water. A valve between the two, in the conduit between, controls flow to the ejector, which is arranged to discharge its flow through 14, into tank T. The uprising section, 3, of the ejector makes a horizontal turn, being enlarged and contracted before it enters the tank, T, with its center line on dotted line position, 28. In the enlarged section, a small orifice, O, is installed.

The ejector creates a subatmospheric pressure much in excess of that required or used. This must be so and it therefore constitutes a limiting factor on the range of level variation which can be handled. It is not practical to commercially employ ejectors and expect them to maintain a vacuum very closely approximate to a perfect vacuum. Hence, the limits are determined by the pressure of the atmosphere to lifts not exceeding something like 28 feet of vertical lift of water, if water be the liquid which is being lifted, in commercial applications or subatmospheric pressure.

Usually, however, it is not necessary to register even this much variation of level. Most such level variations, of useful employment, are very materially less than this and the range of useful employment of subatmospheric pressures may be said to cover the most important and practically all those commonly encountered.

Inside the tank, the section of the ejector, 60, is threaded into a T. One branch of this, 17, of adequate size, extends below dotted line position, 28, or minimum water level in the tank, T. The upward branch of the T is reduced and a smaller conduit, 33, extends upwardly to the L, 47, and from there to the casing head, 75, of the diaphragm, D', the small conduit, 33, forming a pressure tight connection between the inside of the casing head, 75, and the upward branch of the T on the end of the line 60, in the tank, T.

The diaphragm, D', is hermetically sealed in its casing, 75, but its lower surface is open to atmosphere. Its casing, 75, is supported on legs, 31, and affixed rigidly to the top of valve chamber, 30, the diaphragm, D', being attached, by suitable connections, to the upper extremity of the stem of the balanced valve, 29. This affords an arrangement whereby the balanced valve, 29, diaphragm D and diaphragm D' must move, if they move at all, coincidentally and equally, and without lost motion between the parts.

With this description of the arrangement of parts well in mind, I now proceed to describe the functioning of the various parts, in practical operation. It is assumed, in the first instance, that the clear well level stands at the dotted line position marked 28, in other words, the clear well is full and no flow from the filter is desired.

If, at such time, valve V', be opened, a flow will occur through the ejector, E, and a suction will be created in its suction inlet but the water level in tank T will be standing at the dotted line position 26 and therefore only a flow through the small orifice, O, will result. There will be no attenuation of atmosphere beyond O, hence there will be no subatmospheric pressure in the conduit, 33, or in the pressure chamber between the casing head, 75, and the diaphragm, D', therefore the weight of the balanced valve and its associated parts will maintain the balanced valve, 29, in its lowermost and closed position, preventing flow from the filter, even though the filter be clean and the valve, V, be wide open.

In the second instance, assume the level in the clear well to be somewhere below the dotted line position, 28, but above the dotted line position, 27. Wherever it may be, it will be reflected in a level at a corresponding elevation in the tank, T. If, at such time, the valve, V' be opened, a flow will occur through the ejector, E, and a partial vacuum will be created in its suction. This partial vacuum will be exerted to and through the small orifice, O, thus attenuating the air in the upper part of the conduit, 60, in the T threaded thereon and in the descending leg, 17.

Exactly the same amount of attenuation of atmosphere will be existent in the smaller conduit, 33, and the space between the casing head, 75, and the diaphragm, D'. This will exert an upward pull on the diaphragm, D'. When the water level in 17 has been lifted to a level just above the top of the orifice, O, the pull upward on the diaphragm, D', will cause the diaphragm, D', to move upwardly, thus opening the balanced valve to the exact setting where it will permit just enough flow to pass the valve to build up a difference of pressure upon the two sides of diaphragm, D, to counterbalance the upward pull on diaphragm, D', which results in a balance between pressures which fixes the balanced valve in the position required to produce the rate of flow which is proportional to the distance the water is lifted in 17 and therefore proportional to the level in the clear well, below the dotted line position marked 28.

Thereafter, any change of level in the clear well, between dotted line positions, 27 and 28, will be coincidentally and automatically compensated for by a corresponding and proportional change of subatmospheric pressure, tending to open or close the balanced valve and it will, as a result of such change of subatmospheric pressure, be automatically adjusted in position to control the flow proportionally to any change in level between the dotted line positions.

As before stated, the subatmospheric pressure created in the suction of the ejector is in excess of that required to effect the desired and necessary lift to the ejector. Thus, there is an excess of subatmospheric pressure on the discharge side of the orifice. I have discovered that such excess of subatmospheric pressure, under the arrangements shown herein, cannot be caused to lift the water or other liquid passing the orifice materially above the upper perimeter of the orifice.

An orifice, under the conditions of use herein employed, is really a pressure separator, it automatically withdraws just enough of the higher pressure in the suction of the ejector to effect a lift of liquid from its existing and varying level to and very slightly above the top of the orifice and compels all the excess pressure to be used in creating a velocity of flow through the orifice. Where the lift is small, most of the subatmospheric pressure created in the suction of the ejector is being utilized to create velocity of flow through the orifice and very little of it is being used to effect the lift. With larger lifts, more of the subatmospheric pressure on the discharge side of the orifice is being used to effect the lift and less is being used to create velocity of flow through the orifice. With the ejector fixed in position a short distance above the maximum level to be read and with levels always varying if they do, below this maximum level, it is obvious that the orifice, acting as a pressure separator under the established conditions, must utilize an increasing amount of the subatmospheric pressure on its discharge side to effect lift to the orifice on its approach side.

With the discovery that the level would not rise materially above the top of the orifice and that the attenuation of the air or the subatmospheric pressure existed in the pipe above the orifice, the way to numerous applications of such pressure separator immediately became apparent as shown herein.

Very obviously, without necessity for showing herein, it is a very simple matter to so arrange the tank, T, as to maintain therein a constant level, at definite distance below the orifice, O, and if this be done, the subatmospheric pressure acting to lift the balanced valve will remain constant and, so remaining constant, the rate of flow through the balanced valve, 29, will remain constant, as long as the filter remains sufficiently clean to permit such volume of flow to pass through the filtering medium.

It is also obvious that if the small conduit, 33, be branched, at the L, 47, and connected to other casing heads, similar to 75, conveying the same subatmospheric pressure to each and all, this will permit operation of a plurality of filters, by their controllers, and varying the rate of flow from each coincidentally and equally, in proportion to the varying level in one clear well, if the capacity of the ejector be not exceeded.

It is equally obvious that while I have shown an ejector for creating and maintaining a subatmospheric pressure, or partial vacuum, other means may be employed for this purpose and, under certain conditions, prove much more acceptable and satisfactory.

Having thus described an embodiment of my invention, for the purpose of explaining my invention, I wish to state that I am aware of the fact that numerous and extensive departures and applications may be made from the one embodiment of my invention herein illustrated and explained, without departing from the spirit of my invention and I do not, therefore, wish to limit my invention to the embodiment so illustrated and described in this specification.

I claim:

1. In a device of the class described, with relation to a fixed datum level for liquid, an orifice having a high pressure and a low pressure side arranged at the fixed datum level; an evacuator means for establishing subatmospheric pressures upon the low pressure side of said orifice; a support for said orifice including means extending above and below said orifice for hermetically enclosing a body of liquid at the fixed datum level and for enclosing a body of gas above said enclosed liquid in communication with the high pressure side of said orifice; said liquid and gas-enclosing means having an opening below the plane of the liquid datum level adapted to be hermetically sealed by a supply of liquid; and means communicating with the enclosed gas upon the high pressure side of said orifice above the fixed datum level for transmitting the pressure thereof to pressure responsive mechanism.

2. A device for translating variations in the level of a body of liquid into variations in gas pressure comprising a container for such body of liquid; a conduit communicating with said container having its lower end open so as normally to be sealed by liquid in said container; a vent conduit connecting said first mentioned conduit to a source of sub-atmospheric pressure; said vent conduit having a restricted portion therein defining a pressure difference member through which the pressure in the upper portion of said first mentioned conduit is reduced sufficiently to cause the liquid to rise therein to the level determined by said pressure difference member; said sub-atmospheric pressure source tending to maintain said level of liquid by the flow of liquid and/or gas through said pressure difference member; said device being characterized by the fact that the pressure in said first mentioned conduit above said liquid varies inversely with the rise and fall of the body of liquid in said container within a range having as an upper limit the level determined by said pressure difference member, and having as a lower limit the liquid intake of said first mentioned conduit, or within any range therebetween.

3. A device for actuating a pressure responsive mechanism by the conditions of level of the body of liquid which comprises an hermetic enclosure; an opening in said enclosure adapted to admit liquid therein; a vent in said enclosure above said liquid-admitting opening; means associated with said vent defining a pressure difference member; means for providing atmospheric pressures less than those surrounding said enclosure at the side of said pressure difference member remote from said enclosure; said pressure-providing means being adapted to establish and maintain a sufficient pressure differential to support liquid at a level within said enclosure determined by said vent, and to induce a flow of liquid therethrough, irrespective of the liquid level outside of the enclosure at or between the high and low levels determined by the vent and liquid admitting opening, respectively; said device, when operating, being characterized by the fact that the atmospheric pressure within said enclosure will vary in inverse proportion to the variation in the difference of level of liquid within and without said enclosure, and will remain constant so long as the outer liquid level remains fixed.

4. A device for translating variations in level of a body of liquid into variations in gas pressure, and for utilizing a constant level of liquid to create and maintain a constant gas pressure, comprising an hermetic enclosure; an exhaust orifice therein; a liquid intake opening in said enclosure below the level of said orifice; means for establishing a pressure differential between the downstream side of said orifice and the upstream side of said liquid intake opening, so that, when the latter is sealed by a liquid supply, liquid is caused to rise in said hermetic enclosure and flow through said orifice; said device being characterized by the fact that the pressure in said hermetic enclosure above the liquid therein varies inversely as the pressure at the liquid intake opening varies, such as is represented by changes in level of the liquid supply within a range having as an upper limit the level determined by the exhaust orifice and having as a lower limit the level determined by the intake opening; said device being further characterized by the maintenance of constant pressure within the hermetic enclosure so long as the pressure at the intake opening, as is represented by a static condition of level of the supply liquid, remains invariable.

5. A device for creating and maintaining a source of sub-atmospheric pressure having selective and controllable values of predetermined constancy which comprises an hermetic enclosure for association with a body of liquid; a liquid-admitting passage disposed in said enclosure; a vent in said enclosure above the liquid admitting passage therein; means defining a pressure difference member associated with said vent; means for providing relatively subatmospheric pressure upon the low pressure side of said pressure difference member of lower values than is required to sustain a column of the associated liquid between the level of the vent and the level of the liquid-admitting passage; said device being characterized by the fact that variation or fixation in level of the body of liquid outside of said hermetic enclosure effects variation and fixation, respectively, of the atmospheric pressure within said enclosure, whereby, by varying or fixing the level of the body of liquid, the isolated atmosphere is regulated to and maintained at the desired values.

6. A device for controlling, indicating, recording, or otherwise utilizing, the variations or differences of level of a body of liquid by means of a portion of the atmosphere overlying the same, which includes means for hermetically isolating a portion of the liquid and adjacent atmosphere; means for evacuating the contents of said isolating means; means for admitting a flow of liquid between the body of liquid and the isolated portion thereof toward said evacuating means, so as to establish a level of liquid in said isolating means substantially at the level at which evacuation is effected; said device being characterized in that the lowering of the level of the body of liquid exteriorly of the isolating means below the evacuating level therein proportionally lowers the specific gravity of the included atmosphere, and vice versa.

CHARLES ARTHUR BROWN.